US012300940B2

(12) United States Patent
Yu

(10) Patent No.: US 12,300,940 B2
(45) Date of Patent: May 13, 2025

(54) SHIELDING MEANS AND HIGH-SPEED ELECTRICAL CONNECTOR USING THE SAME

(71) Applicant: CWE (Chengdu) Technology Co., LTD., Chengdu (CN)

(72) Inventor: Jianmei Yu, Chengdu (CN)

(73) Assignee: CWE (CHENGDU) TECHNOLOGY CO., LTD., Chengdu (CN)

( * ) Notice: Subject to any disclaimer, the term of this patent is extended or adjusted under 35 U.S.C. 154(b) by 190 days.

(21) Appl. No.: 17/740,263

(22) Filed: May 9, 2022

(65) Prior Publication Data

US 2023/0238744 A1 Jul. 27, 2023

(30) Foreign Application Priority Data

Jan. 26, 2022 (CN) ......................... 202210093088.0
Jan. 26, 2022 (CN) ......................... 202210094112.2
Jan. 26, 2022 (CN) ......................... 202210094128.3
Jan. 26, 2022 (CN) ......................... 202220216008.1
Jan. 26, 2022 (CN) ......................... 202220216023.6
Jan. 26, 2022 (CN) ......................... 202220216078.7

(51) Int. Cl.
*H01R 13/6583* (2011.01)
*H01R 13/24* (2006.01)
*H01R 13/516* (2006.01)
*H01R 13/6471* (2011.01)
*H01R 13/6591* (2011.01)

(52) U.S. Cl.
CPC ......... *H01R 13/6583* (2013.01); *H01R 13/24* (2013.01); *H01R 13/516* (2013.01); *H01R 13/6471* (2013.01); *H01R 13/6591* (2013.01)

(58) Field of Classification Search
CPC ............ H01R 13/6586; H01R 13/6587; H01R 13/6583; H01R 13/24; H01R 13/516; H01R 13/6471; H01R 13/6591; H01R 13/65807; H01R 13/514; H01R 23/688
USPC ................................ 439/95, 607.06, 607.07
See application file for complete search history.

(56) References Cited

U.S. PATENT DOCUMENTS 8,267,721 B2 * 9/2012 Minich ................ H01R 12/724 439/607.05
8,616,919 B2 * 12/2013 Stoner ................ H01R 13/6587 439/607.07
10,355,416 B1 * 7/2019 Pickel ................ H01R 13/6477
(Continued)

*Primary Examiner* — Gary F Paumen
(74) *Attorney, Agent, or Firm* — Cheng-Ju Chiang

(57) ABSTRACT

The present invention discloses a shielding means and a high-speed, electrical connector using the same. The connector includes terminal modules, shielding means and a shell fixing the terminal modules and the shielding means. Each terminal module includes grounding terminals and differential signal pairs embedded within an insulating body. The shielding means has a number of mating tongue and a number of protruding portions formed thereon. Each mating tongue is configured to mechanically and electrically connecting to corresponding grounding terminal. The insulating body defines a number of cutouts and the grounding terminals of the terminal module are partially exposed from the cutouts. The protruding portions of the shielding means are correspondingly retained between the cutouts of the insulating body to securely connecting the shielding means on the terminal module.

8 Claims, 16 Drawing Sheets

(56) References Cited

U.S. PATENT DOCUMENTS

| | | | | |
|---|---|---|---|---|
| 11,757,235 | B2 * | 9/2023 | Liu | H01R 13/514<br>439/607.07 |
| 2011/0143591 | A1 * | 6/2011 | Davis | H01R 13/6587<br>439/607.27 |
| 2014/0242841 | A1 * | 8/2014 | Trout | H01R 13/6585<br>439/607.55 |
| 2015/0303618 | A1 * | 10/2015 | Lee | H01R 13/506<br>439/607.05 |
| 2020/0287332 | A1 * | 9/2020 | Chen | H01R 13/6586 |
| 2021/0194183 | A1 * | 6/2021 | Guo | H01R 13/516 |
| 2021/0399502 | A1 * | 12/2021 | Song | H01R 13/6583 |

* cited by examiner

SHIELDING MEANS AND HIGH-SPEED ELECTRICAL CONNECTOR USING THE SAME

CROSS REFERENCE TO RELATED APPLICATIONS

The present application claims the priority of Chinese patent application serial No. 202220216023.6, filed Jan. 26, 2022 in the SIPO (Sate Intellectual Property Office of the P.R.C.); and Chinese patent application serial No. 202220216078.7, filed Jan. 26, 2022; and Chinese patent application serial No. 202220216008.1, filed Jan. 26, 2022; and Chinese patent application serial No. 202210093088.0, filed Jan. 26, 2022; and Chinese patent application serial No. 202210094128.3, filed Jan. 26, 2022; and Chinese patent application serial No. 202210094112.2, filed Jan. 26, 2022. The present application also relates to a U.S. patent application filed in the same day as the instant application and entitled as "Terminal Module and High-Speed Electrical Connector Using the Same" with the same inventorship and applicant(s). The content of above-referenced patent applications is incorporated by reference herein in its entirety.

BACKGROUND

1. Technical Field

The present disclosure relates to an electrical connector, and more particularly, to a shielding means and a high-speed electrical connector using the same.

2. Description of Related Art

Backplane connectors are widely used in communication technology, which is a common type of connector for large communication equipment, ultra-high-performance servers and giant computers, industrial computers, and high-end storage devices, etc. Backplane connectors typically include a number of signal modules arranged along the left-to-right directions. Each signal module usually has an insulator, a plurality of differential signal terminal pairs. The signal pairs are arranged along the top-to-bottom directions and are fixed to the insulator. The conventional backplane connector employs two shields assembled on two opposite sides of the insulator along the left-to-right directions. However, conventional backplane connectors have drawbacks in crosstalk resistance as well as insertion loss reduction.

Hence, it is desirable to provide an improved shieled high-speed high-density electrical connector.

SUMMARY

The present disclosure provides a shielding means for high-speed, high-density electrical connector. The shielding means comprises a main substrate and a mating section extending from the main substrate with a plurality of mating tongue and a plurality of mating depressions formed thereon along the first direction. The main substrate has a front edge and a bottom edge, the front edge extending along a first direction and the bottom edge extending along a second direction perpendicular to the first direction. Each of the plurality of mating depression is arranged between two of the mating tongues, the plurality of mating tongue and the plurality of mating depression deviate from each other with respect to the main substrate.

Further, the present disclosure also provides a shielding means, wherein said main substrate has a plurality of protruding portion protruded therefrom along the third direction perpendicular to both the first direction and the second direction.

Further, the present disclosure also provides a shielding means, wherein said protruding portion extends between said front edge and said bottom edge and is formed by several segments.

Further, the present disclosure also provides a shielding means, wherein an elongated groove is defined on said main substrate correspondingly opposite to said protruding portion.

Further, the present disclosure also provides a shielding means, wherein a gap is formed at an intersection position between said protruding portion and said bottom edge.

Further, the present disclosure also provides a shielding means, wherein the first direction is a height direction of the high-speed, high-density electrical connector.

Further, the present disclosure also provides a shielding means, wherein the number of the protruding portion is same as the number of the mating depressions.

Further, the present disclosure also provides a shielding means, wherein said mating tongues and said protruding portions have same protruding directions with respect to the main substrate.

Further, the present disclosure also provides a shielding means, wherein each of said mating depression has a pair of tuning holes defined therethrough along said second direction.

Further, the present disclosure also provides a shielding means, wherein the second direction projecting area of the mating tongue does not overlap with the second direction projecting area of the mating depression, while the second direction projecting area of the mating depression partially overlaps with the second direction projecting area of the protruding portion.

Further, the present disclosure also provides a shielding means, wherein said mating tongue, said mating depression and said main substrate are located at different positions from a top view.

The present disclosure also provides a high-speed, high-density electrical connector, comprises a plurality of terminal modules, a plurality of shielding means and a shell. Each terminal module comprises grounding terminals and differential signal pairs embedded within an insulating body. Each shielding means is stacked arranged between each two adjacent terminal modules. The shell fixes the stacked shielding means and terminal modules along a front-to-back direction. The shielding means comprise a plurality of mating tongue and a plurality of protruding portions formed thereon. Each mating tongue is configured to mechanically and electrically connecting to corresponding grounding terminal. The insulating body defines a plurality of cutouts thereon and the grounding terminals of the terminal module are partially exposed from the cutouts. The protruding portions of the shielding means are correspondingly retained between the cutouts of the insulating body to securely connecting the shielding means on the terminal module.

Further, the present disclosure also provides a shielding means, wherein said shielding means has a main substrate having a front edge and a bottom edge, said front edge extending along a top-to-bottom direction and the bottom edge extending along a front-to-back direction; and wherein said mating section extends from said main substrate with a plurality of mating depressions formed thereon, wherein each of said plurality of mating depression is arranged between two of said mating tongues, said plurality of mating tongue and said plurality of mating depression deviating from each other with respect to said main substrate.

Further, the present disclosure also provides a shielding means, wherein said protruding portion extends between said front edge and said bottom edge and is formed by several segments.

Further, the present disclosure also provides a shielding means, wherein an elongated groove is defined on said main substrate correspondingly opposite to said protruding portion.

Further, the present disclosure also provides a shielding means, wherein a gap is formed at an intersection position between said protruding portion and said bottom edge.

Further, the present disclosure also provides a shielding means, wherein the number of the protruding portion is same as the number of the mating depressions; and wherein said mating tongues and said protruding portions have same protruding directions with respect to the main substrate.

Further, the present disclosure also provides a shielding means, wherein each of said mating depression has a pair of tuning holes defined therethrough along said second direction.

Further, the present disclosure also provides a shielding means, wherein along a front-to-back direction, the projecting area of the mating tongue does not overlap with the projecting area of the mating depression, while the projecting area of the mating depression partially overlaps with the projecting area of the protruding portion.

Further, the present disclosure also provides a shielding means, wherein said shell comprising a front cover and a rear stiffener; and wherein both of said different signal pairs and said grounding terminals have contacting fingers located in said front cover; and wherein said stacked terminal modules and said shielding means are fixed together by said rear stiffener from a rear side thereof.

The foregoing has outlined rather broadly the features and technical advantages of the present disclosure in order that the detailed description of the invention that follows may be better understood. Additional features and advantages of the invention will be described hereinafter which form the subject of the claims of the invention.

BRIEF DESCRIPTION OF THE DRAWINGS

The components in the drawing are not necessarily drawn to scale, the emphasis instead being placed upon clearly illustrating the principles of the described embodiments. In the drawings, reference numerals designate corresponding parts throughout various views, and all the views are schematic.

DETAILED DESCRIPTION OF ILLUSTRATED EMBODIMENTS

Figure 1:
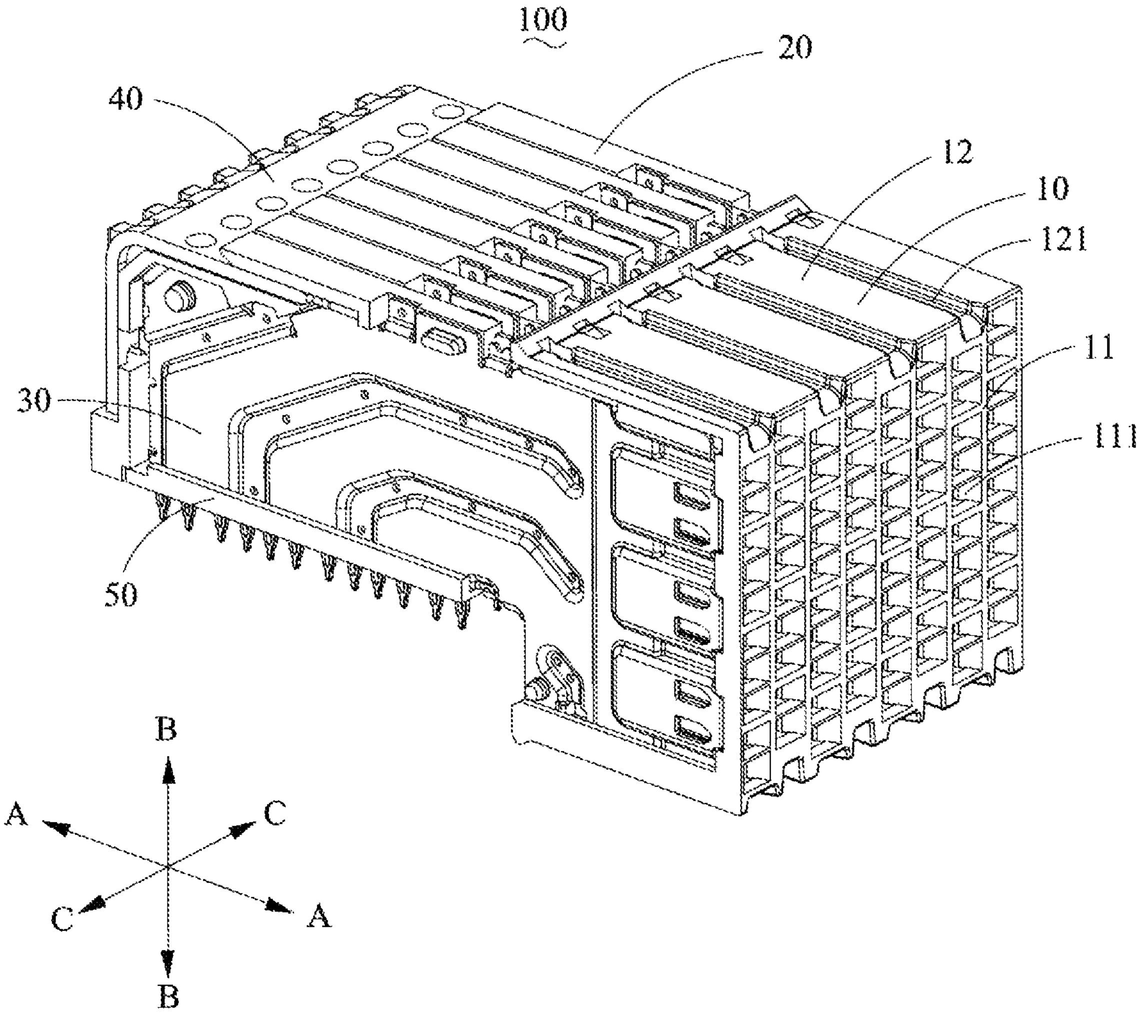
FIG. 1 is a perspective view of an electrical connector in accordance with a first embodiment of the present disclosure.

Reference will now be made to the drawing figures to describe the embodiments of the present disclosure in detail. In the following description, the same drawing reference numerals are used for the same elements in different drawings.

Figure 2:
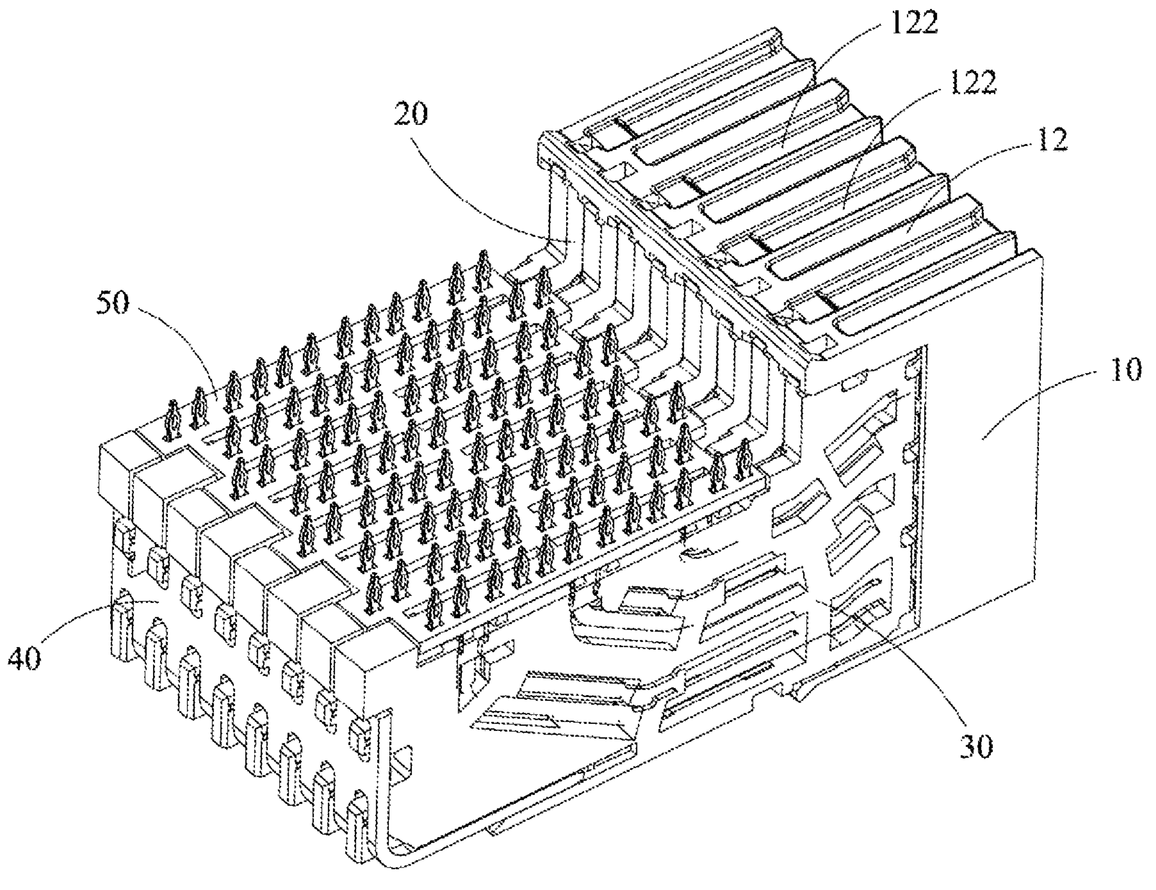
FIG. 2 is a perspective view of the electrical connector as shown in FIG. 1 while taken from a different aspect.

Referring to FIG. 1 and FIG. 2, an electrical connector 100 in accordance with the present invention, comprises a front shell 10, a plurality of terminal modules 20 assembled on the front shell 10, a plurality of shielding elements 30, a back shell 40 for fixing the terminal modules 20 and an insulating base 50. Particularly, three directions shown in the FIG. 1 are AA in the first direction, BB in the second direction, and CC in the third direction. The relationship between the three directions is perpendicular to each other.

Figure 3:
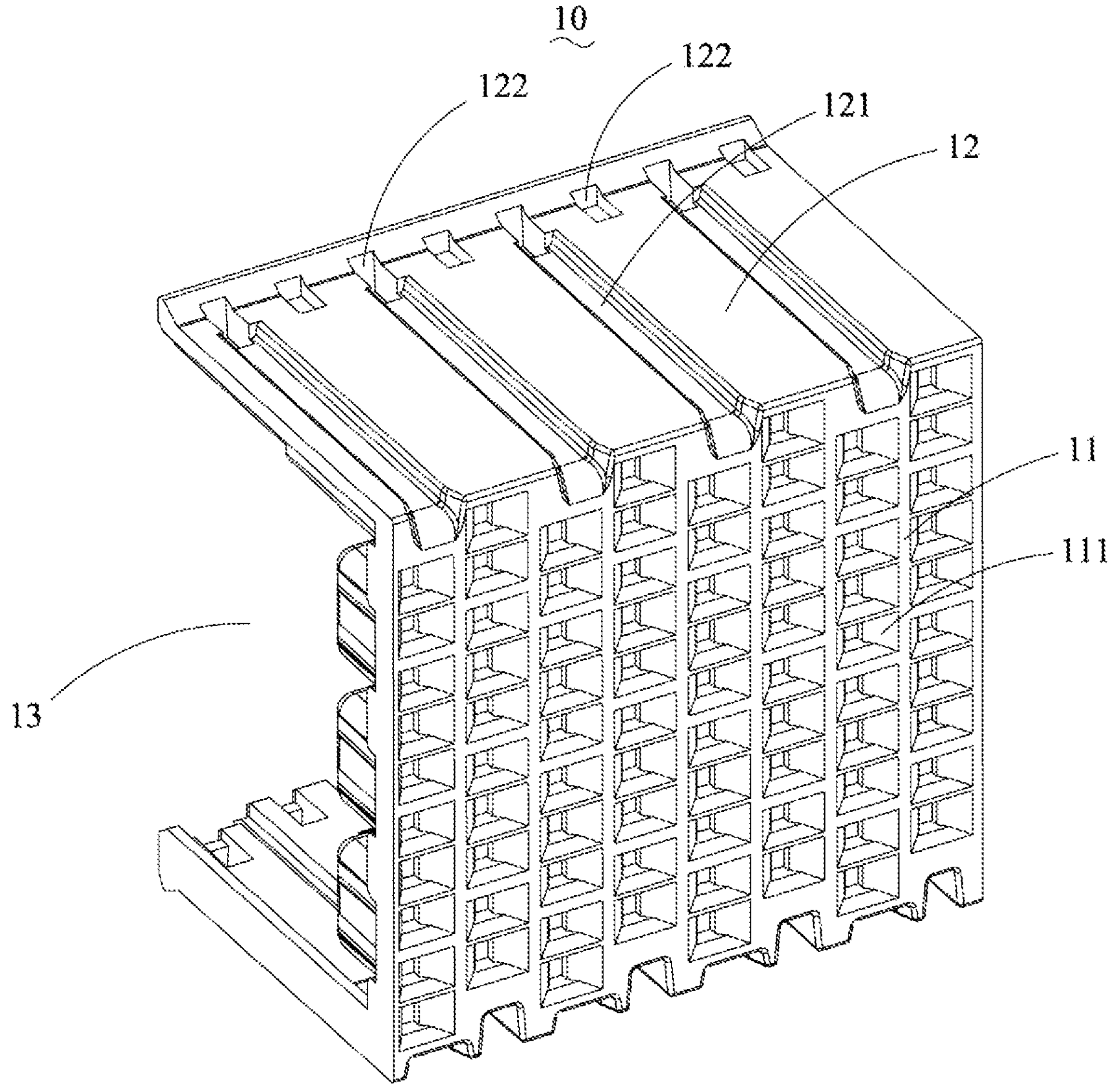
FIG. 3 is a perspective view of a shell of the electrical connector as shown in FIG. 1.

Referring to FIG. 3 together with FIG. 1, FIG. 2, the front shell, which is also can be named as front cover 10, comprises a mating wall 11 and side walls 12. The mating wall 11 and the side walls 12 are jointly enclosed to define a containing space 13 to contain the terminal module 20 and the shielding elements 30. The mating wall 11 is configured to cooperate with the complementary connector (not shown), which has a plurality of mating holes 111 arranged in matrix. The plurality of mating holes 111 extend along a first direction AA through the mating wall 11, and communicate to the containing space 13. The first direction AA is the direction along which the electrical connector 100 engages to the complementary connector. The side wall 12 is provided with guiding portions 121, which are used to guide the complementary connector to insert into the electrical connector 100, and first fixing portions 122. In the preferred embodiment, each side wall 12 is provided with a plurality of guide portions 121. Preferably, the spacing between the two neighbored guide portions 121 on one side wall 12 is greater than the spacing between the two neighbored guide portions 121 on the other side wall 12. By such an arrangement, it can not only guide the complementary connector engaging with the electrical connector 100, but also can avoid a mis-inserting therebetween. In the present embodiment, the guiding portions 121 are designed to be a plurality of guiding slots along a first direction AA. Understandably, in other embodiments, the guiding portions 121 can be designed to be a plurality of guiding protrusions protruded from the side wall 12 and arranged along a first direction AA. The first fixing portion 122 is located at one end of the side wall 12 away from the mating wall 11, which is adapted for cooperating with the terminal module 20 and fixing the terminal module 20 on the front shell 10. In the present embodiment, the number of side walls 12 is two, but it will be appreciated that in other embodiments, the number of sidewalls 12 may be set as needed. More detailly, the side walls 12 of the preferred embodiment has a top sidewall and a bottom sidewall. In this preferred embodiment, the front shell/cover 10 has a U-shaped cross-section.

Figure 4:
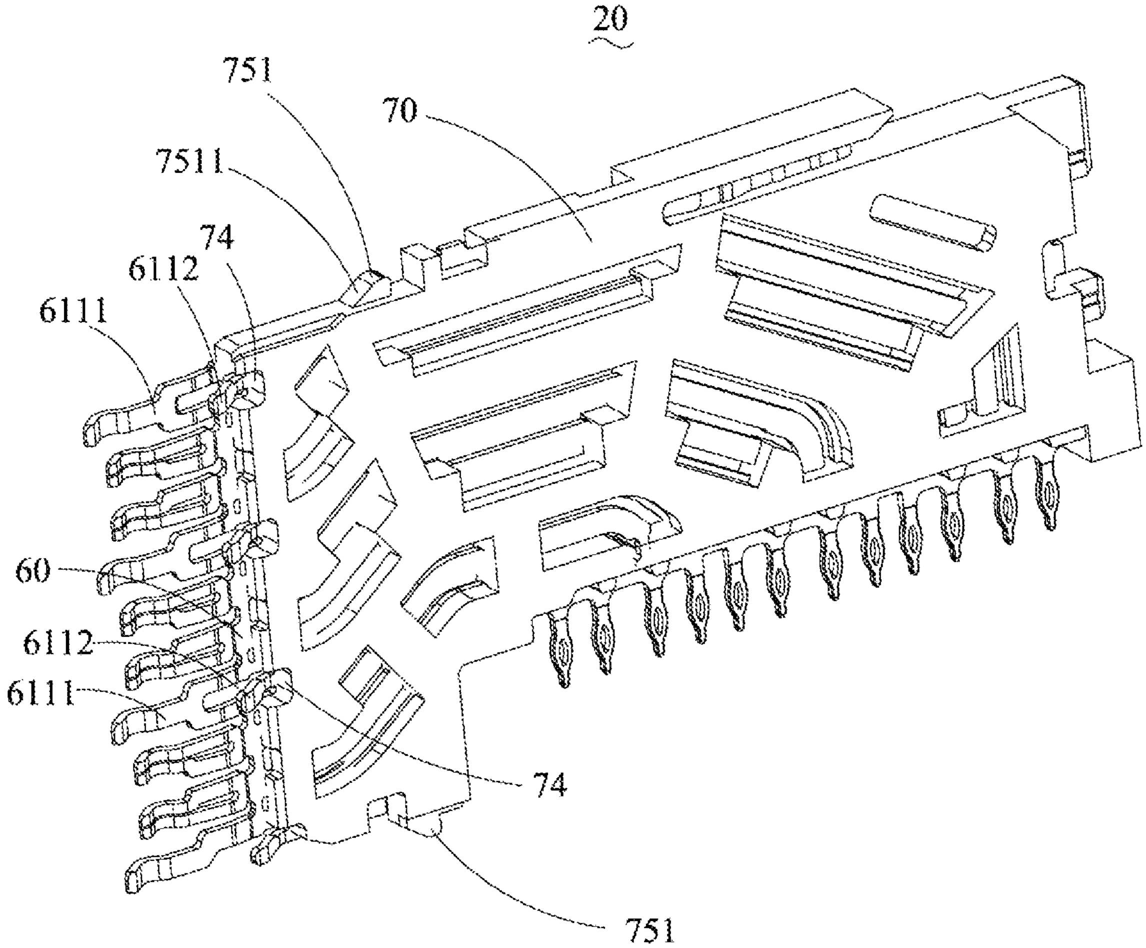
FIG. 4 is a perspective view of a contact wafer of the electrical connector as shown in FIG. 1.
Figure 5:
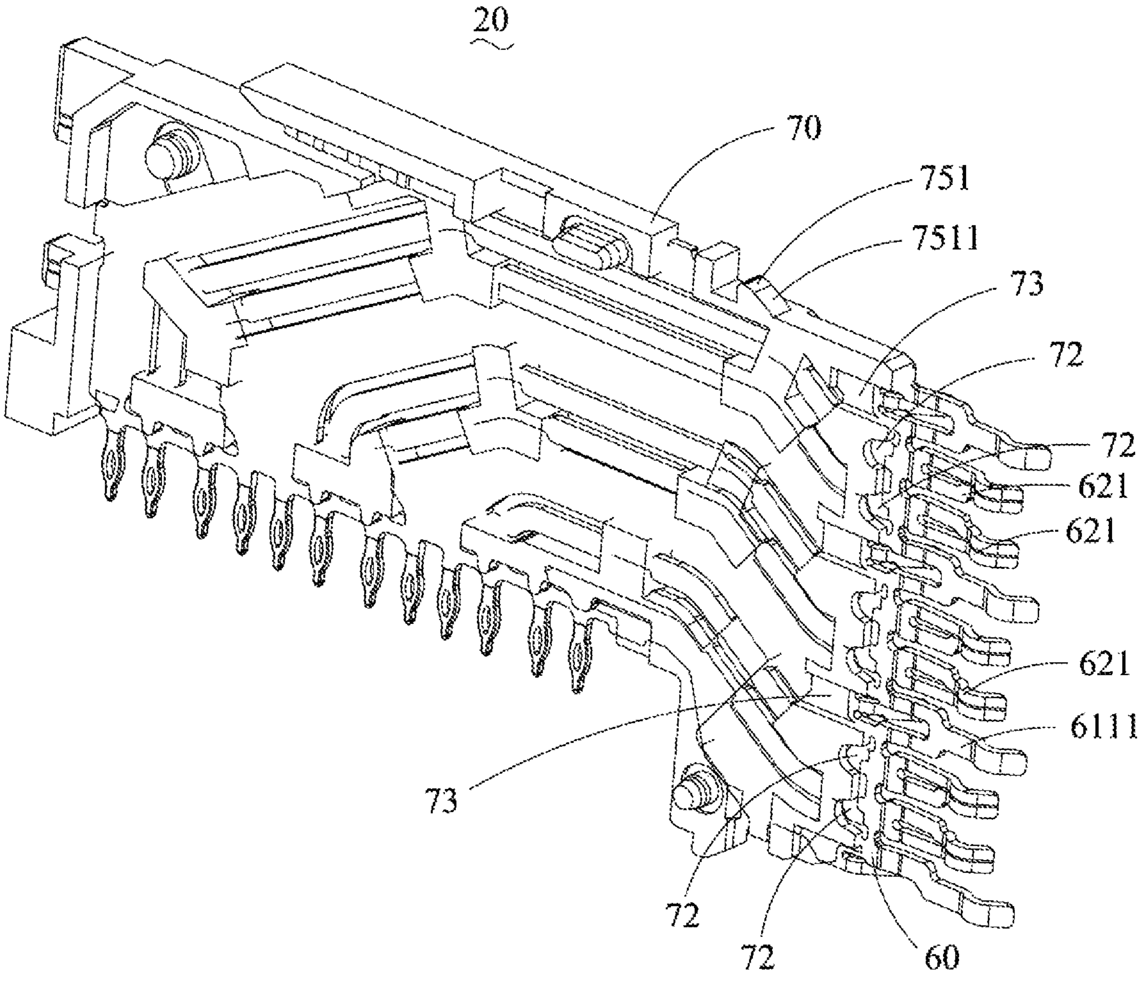
FIG. 5 is a perspective view of the contact wafer as shown in FIG. 4 while taken from a different aspect.
Figure 6:
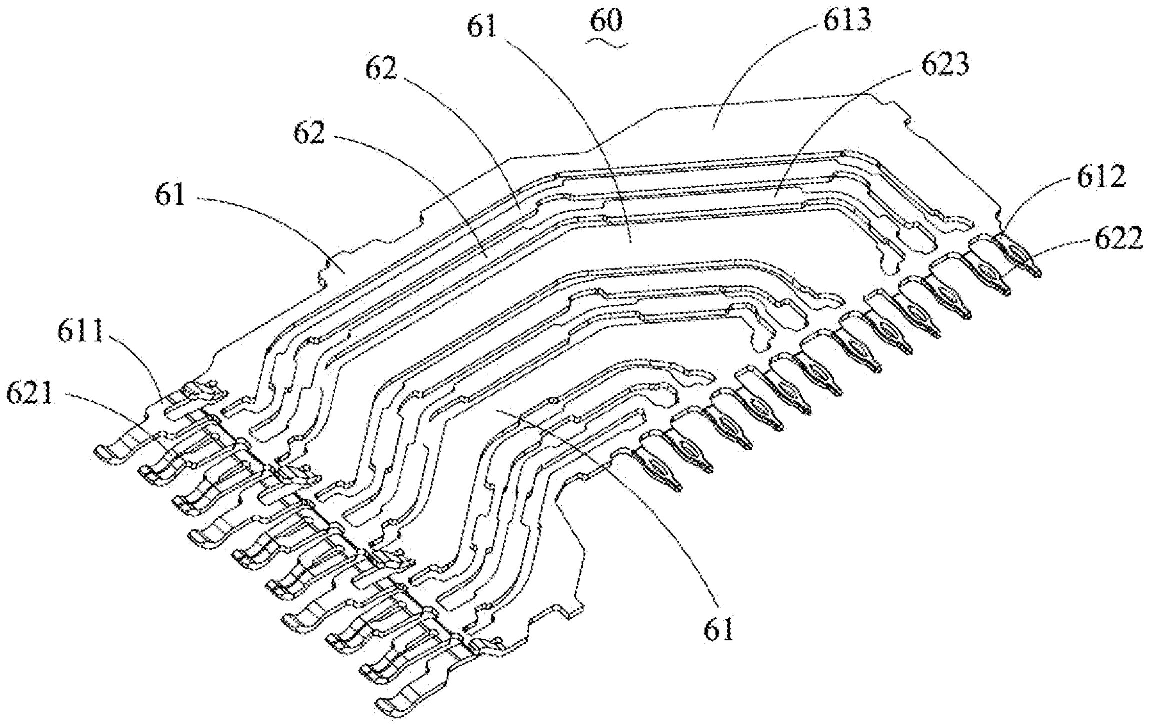
FIG. 6 is a perspective view of a contact assembly of the electrical connector as shown in FIG. 1.
Figure 7:
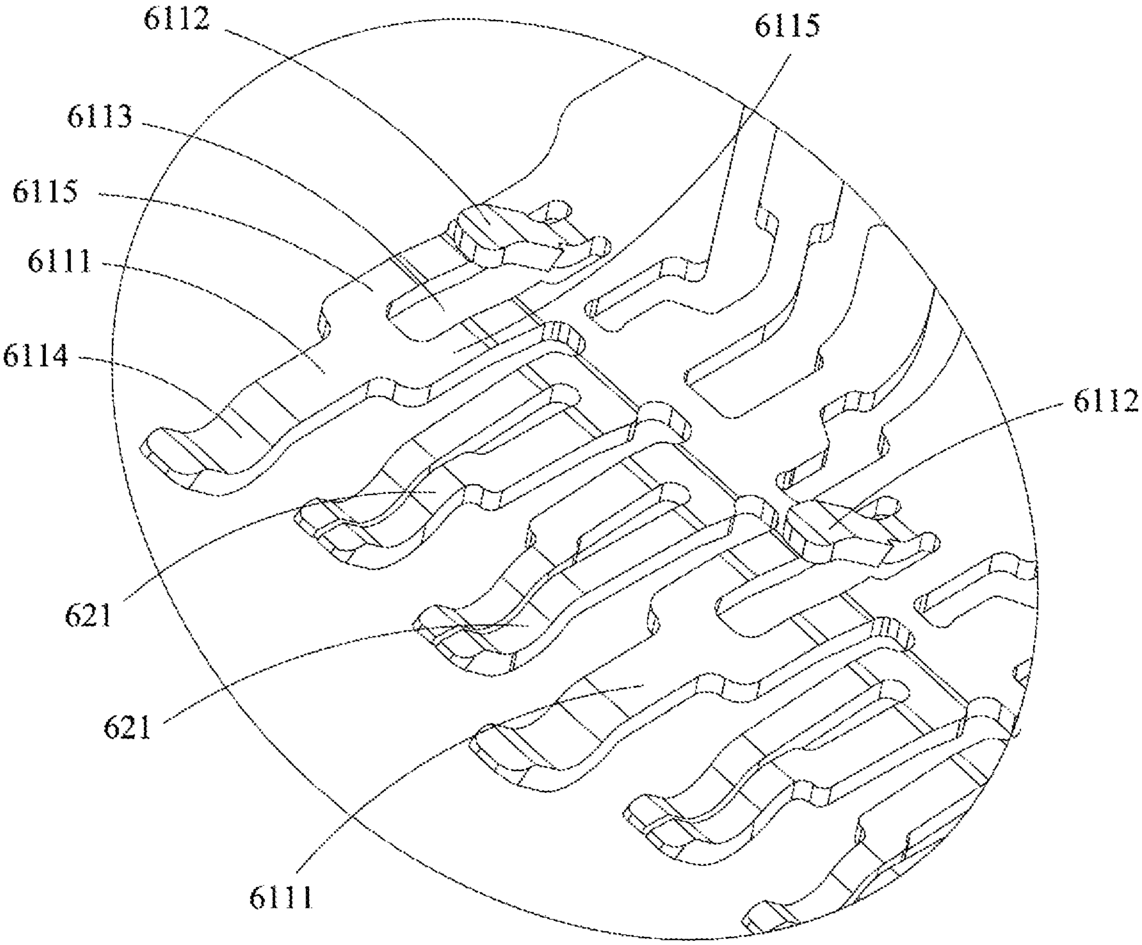
FIG. 7 is an enlarged perspective view of the contact assembly of FIG. 6.

Referring to FIG. 4, FIG. 5 and FIG. 1, the plurality of terminal modules 20 are arranged along the third direction CC which is perpendicular to the first direction AA. The terminal module 20 includes a terminal assembly 60 and an insulating wafer/body 70 for fixing the terminal assembly 60. Referring to FIG. 6 and FIG. 7, the terminal assembly 60 includes a plurality of ground terminals/contacts 61 and a plurality of differential signal terminal pairs. The differential signal terminal pair is disposed between adjacent ground terminals 61. Since the differential signal terminal pair is disposed along the second direction BB and arranged between the adjacent two ground terminals 61 in the same terminal module 20, the signal interference between the adjacent two differential signal terminal pairs can be shielded, thereby enhancing the electromagnetic isolation between the differential signal terminal pairs, improving insertion loss and reducing signal crosstalk.

The grounding terminal 61 includes a first contacting portion 611, a first mounting portion 612 and a first connection portion 613 connecting the first contacting portion 611 and a first mounting portion 612. The first contacting portion 611 extends outwards from one side of the first connection portion 613 along the first direction AA, the first mounting portion 612 extends outwards from the other side of the first connection portion 613 in the fourth direction. In the present embodiment, the fourth direction coincides with the second direction BB. The first mounting portion 612 is used to engage with a printed circuit board on which the electrical connector is mounted thereon. However, it will be appreciated that in other embodiments, the fourth direction may also coincide with the second direction BB, e.g., an acute angle is formed between the fourth direction and the second direction BB. Referring to FIG. 7, the first contacting portion 611 includes a first contacting arm 6111 electrically connecting with a first grounding means and a second contacting arm 6112 electrically connecting with a second grounding means. In the present embodiment, the first grounding means is grounding terminals of the complementary connector, and the second grounding means is the shielding element 30. When the electrical connector 100 is engaged with the complementary connector, the first grounding means and the second grounding means are located on both sides of the first connection portion 613 in the thickness direction of the first connection portion 613. Since the ground terminal 61 is electrically connected to the shielding element 30, adjacent shielding elements 30 electrically connects with each other thereby establishing a grounding circle. The first contacting arm 6111 is formed from the side of the first connection 613 along the first direction AA outward extension formed. The first contact arm 6111 includes a contacting finger 6114 and a pair of connecting arms 6115 extending backwards from the contacting finger 6114. A slot 6113 is defined between the pair of connecting arms 6115. In the preferred embodiment, the second contacting arm 6112 is formed by stamping from the grounding terminal 61, therefore the stamped slot is formed the slot 6113. The first contacting arm 6111 and the second contacting arm 6112 are in a straight line in the first direction AA, thereby effectively shortening the length of the terminal assembly 60 in the second direction BB.

Figure 8:
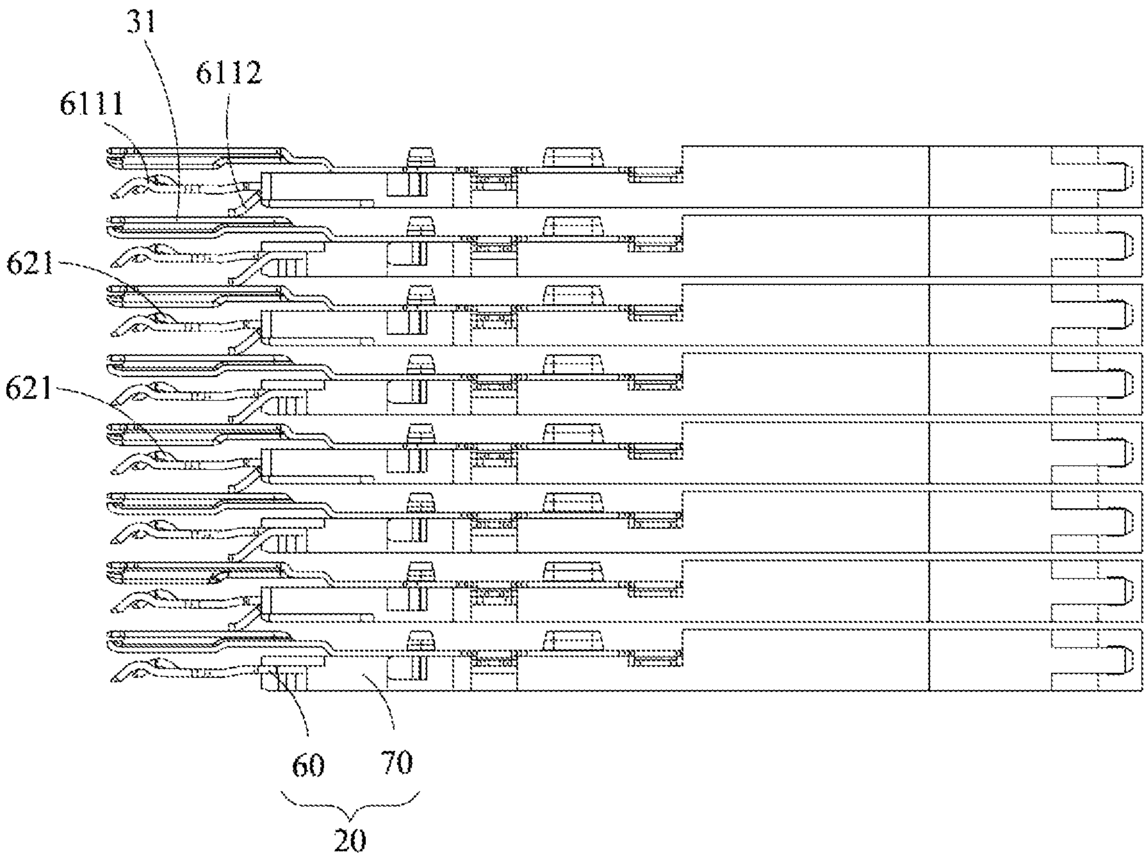
FIG. 8 is a schematic view of the contact wafers and the shielding elements of the electrical connector as shown in FIG. 1 after assembling.

Referring to FIG. 8, a contact region between the first contacting arm 6111 and the grounding terminal of the complementary connector is defined as the first contact region, and similarly, the contact region between the second contacting arm 6112 and the shielding element 30 is defined as the second contact region. Along the thickness direction of the first connecting portion 613 (i.e., the third direction CC), the first contact region, the second contact region are located on opposite sides of the first connecting portion 613. In the present embodiment, at least one of the first contacting arm 6111, the second contacting arm 6112 is an elastic contacting arm. However, it will be appreciated that, in other embodiments, at least one of the first contacting arm 6111 and the second contacting arm 6112 may also be provided as a rigid contacting arm.

Referring to FIG. 6, the first connection portion 613 is curved so that the extending direction of the first contacting portion 611 is not parallel to the extending direction of the first mounting portion 612. In the present embodiment, the extending direction of the first contacting portion 611 is perpendicular to the extending direction of the first mounting portion 612. However, it will be appreciated that, in other embodiments, the extending direction of the first contacting portion 611 and the extending direction of the first mounting portion 612 may also not be perpendicular, e.g., the two portions are parallel or the angle between the two portions is an acute angle. The first mounting portion 612 is soldered to the circuit board, which may be a fisheye solder pin, a needle solder pin, an SMT solder pin, or a convex bag.

Referring to FIG. 6 and FIG. 7, the differential signal terminal pair comprises two differential signal terminals 62. The differential signal terminal 62 includes a second contacting portion 621, a second mounting portion 622 and a second connection portion 623 connecting the second contacting portion 621 and a second mounting portion 622. The first contacting arm 6111, the second contacting portion 621 is arranged along the second direction BB. The contacting area between the second contacting portion 621 and the signal terminal of the complementary connector is deemed as a third contact region. Referring to FIG. 8, in the thickness direction of the first connection portion 613 (i.e., the third direction CC), the first contact region, the third contact region are located at the same side of the first connection portion 613, the second contact region is located on the other side of the first connection portion 613. The second connection portion 623 is curved so that the extending direction of the second contacting portion 621 is not parallel to the extending direction of the second mounting portion 622. In the present embodiment, the extending direction of the second contacting portion 621 is perpendicular to the extending direction of the second mounting portion 622. However, it will be appreciated that, in other embodiments, the extending direction of the second contacting portion 621 and the extending direction of the second mounting portion 622 may also not be perpendicular to each other, e.g., the two portions are parallel or the angle between the two portions is an acute angle. The second mounting portion 622 is soldered to the circuit board, which may be a fisheye solder pin, a needle solder pin, an SMT solder pin, or a convex bag.

Figure 9:
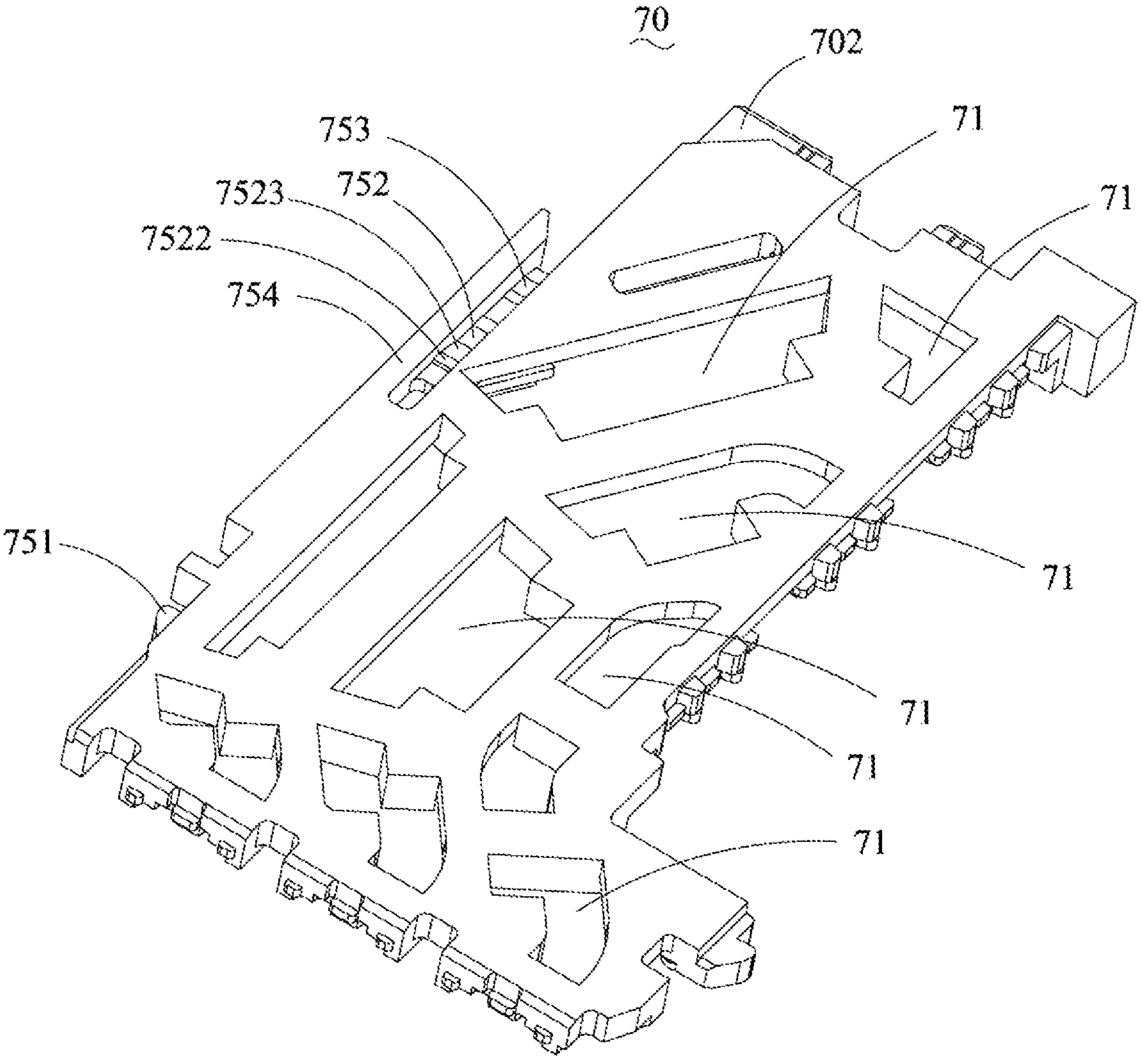
FIG. 9 is a perspective view of an insulative housing of the electrical connector as shown in FIG. 1.
Figure 10:
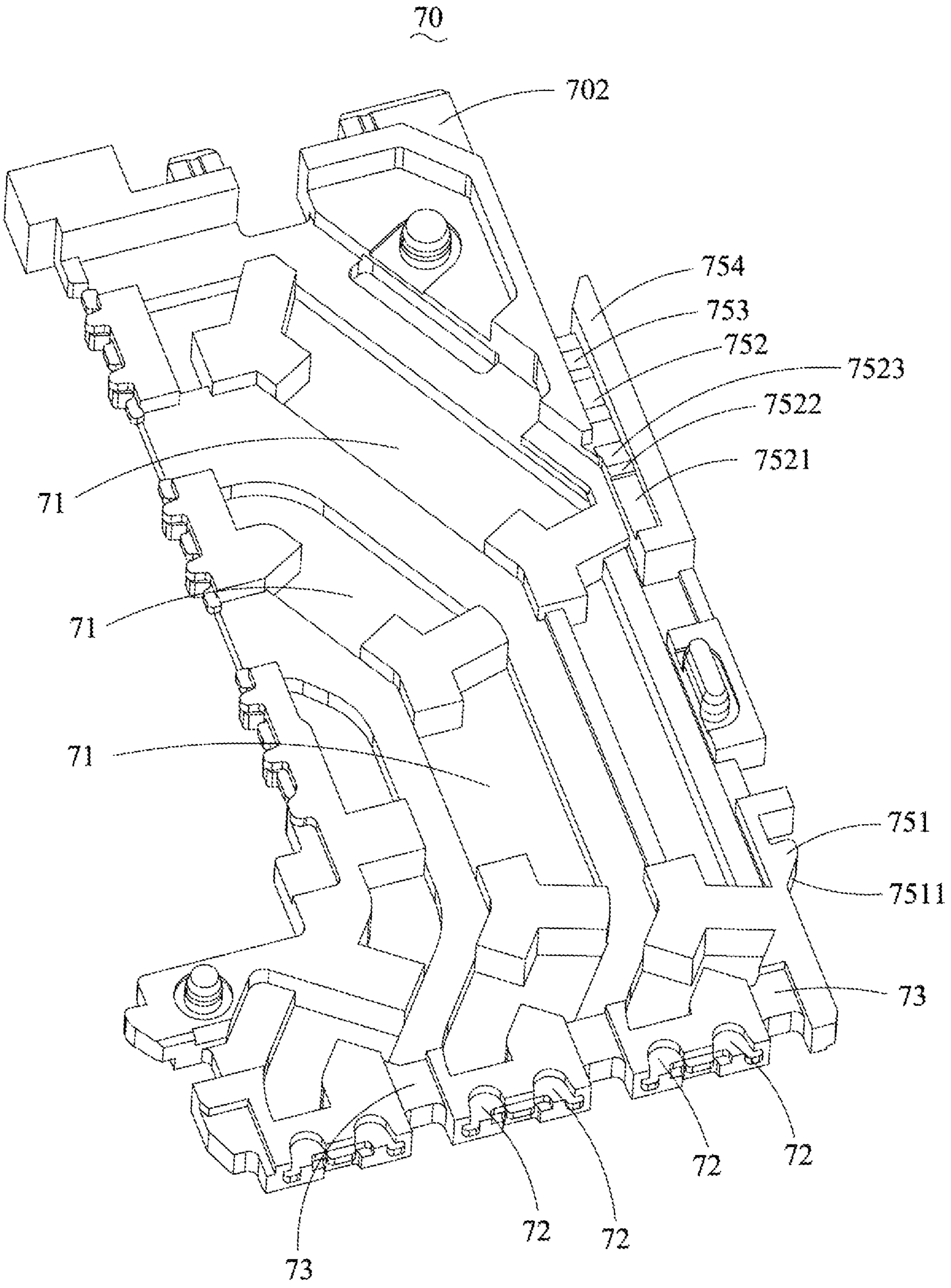
FIG. 10 is a perspective view of the insulative housing as shown in FIG. 9 while taken from a different aspect.

Referring to FIG. 9 and FIG. 10, the insulating wafer 70 is used to hold the first connection portion 613, the second connection portion 623, to thereby fix the ground terminal 61 and the differential signal terminals 62 thereto. The insulating wafer 70 is provided with a cutout 71. The cutout 71 extends through the insulating wafer 70 along the thickness direction thereof (i.e., the third direction CC). The cutout 71 is used to make the first connection portion 613 and the second connection portion 623 partially exposed to air. Since the dielectric constant of the air is less than the dielectric constant of the insulating material, therefore, by such a design, it may reduce the insertion loss of the electrical connector 100, and increase the transmission speed of the signals. Preferably, the part of the terminal assembly 60 which is exposed from the cutout 71 is provided with an insulating film. The insulating film can effectively avoid the problem of poor insulation withstand voltage or short circuit caused by free or stationary wire or metal chips produced during manufacturing the electrical connector. Preferably, the thickness of the insulating film is 0.01 mm to 0.1 mm. In the present embodiment, the first connection portion 613 and the second connection portion 623 are partially located within the cutout 71. Referring to FIG. 5 as shown in FIG. 10, the insulating wafer 70 is provided with a first concession slot 72 near the second contacting portion 621. In the first direction AA, the first concession slot 72 is directly facing to the second contacting portion 621. When the electrical connector 100 is engaged to the complementary connector, the signal terminal of the complementary connector is located in the first concession slot 72.

Referring to FIG. 5 together with FIG. 10, the insulating wafer 70 is provided with a second concession slot 73 near the first contact arm 6111. In the first direction AA, the second concession slot 73 is directly facing to the first contact arm 6111. When the electrical connector 100 is engaged to the complementary connector, the ground terminal of the complementary connector is located in the second concession slot 73. Referring to FIG. 4 and FIG. 9, similarly, the insulating wafer 70 is provided with a third concession slot 74 near the second contact arm 6112. In the first direction AA, the third concession slot 74 is directly facing to the second contact arm 6112, and the second contact arm 6112 is at least partially located within the third concession slot 74.

Referring to FIG. 9 and FIG. 10, the insulating wafer 70 is provided with a second fixing portion 751 and a retaining recess 752 on one side opposite to the top side wall 12. The second fixing portion 751 is mated to the first fixing portion 122 to mount the terminal module 20 fixed on the front shell/cover 10. In the present embodiment, the first fixing portion 122 is a fixing groove, the second fixing portion 751 is a fixed protrusion in conjunction with the fixing groove. Preferably, the fixed protrusion is provided with a guide portion 7511 to guide the fixed protrusion into the fixing groove 122. Referring to FIG. 9 and FIG. 10, the insulating wafer 70 extends outwards along the second direction BB to form an extension arm 753 and a stopper 754 located at the end of the extension arm 753 away from the insulating wafer 70. The extension arm 753, the stop 754 and the insulating wafer 70 together form the retaining recess 752. The retaining recess 752 is provided with an opening 7521 on one side facing the adjacent terminal modules 20. In the present embodiment, the extension arm 753, the stopper 754 and the insulating body 70 together form two retaining recesses 752. Along the third direction CC, the two retaining recesses 752 are located on opposite sides of the extension arm 753.

Figure 11:
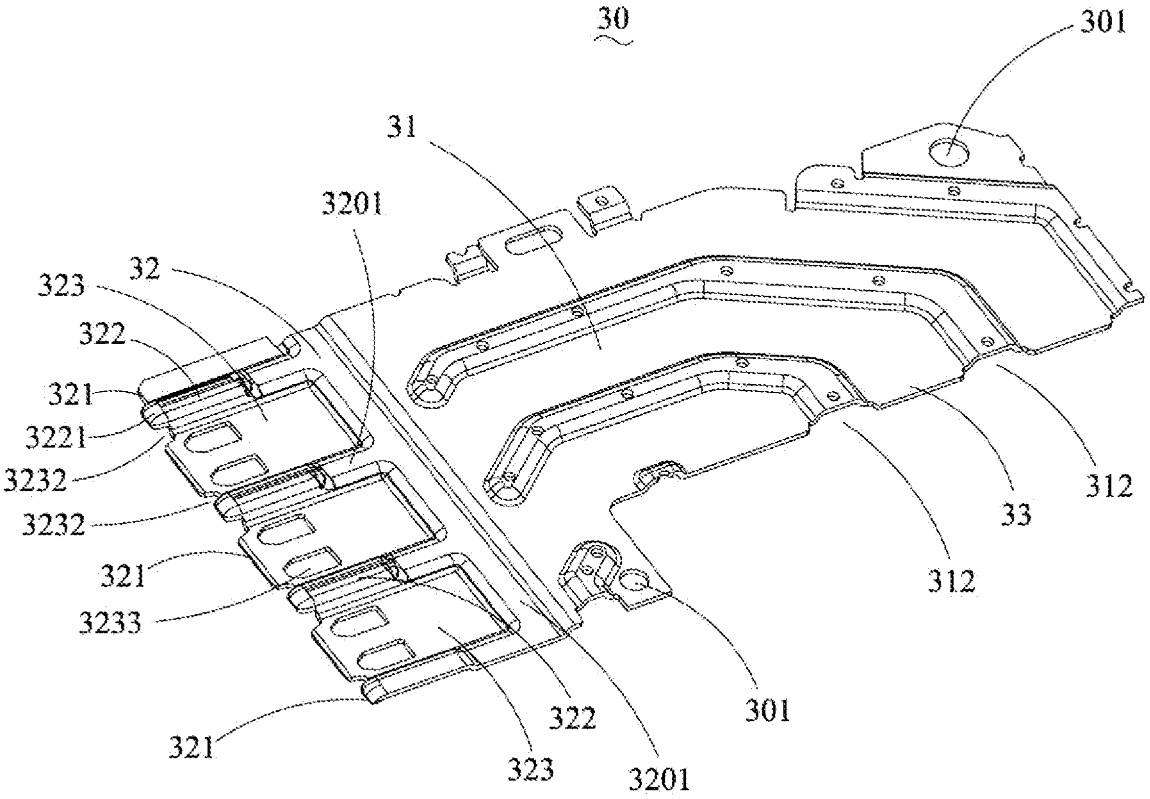
FIG. 11 is a perspective view of the shielding element of the electrical connector as shown in FIG. 1.
Figure 12:
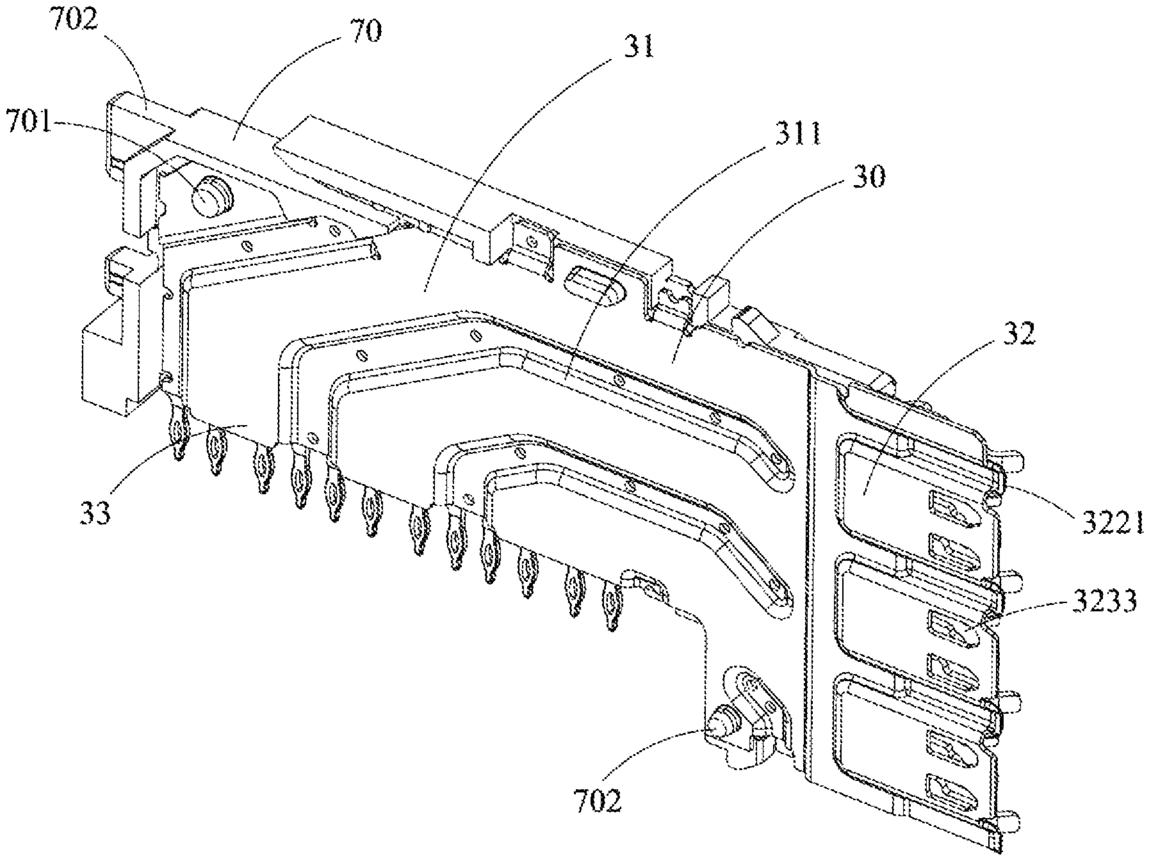
FIG. 12 is an assembled perspective view of one contact wafer and one shielding element of the electrical connector as shown in FIG. 1.

Referring to FIG. 11, FIG. 12 together with FIG. 1, the plurality of shielding elements/means/plates 30 are arranged along the third direction CC. The terminal module 20 is disposed between the adjacent two shielding elements 30. The shielding element 30 is provided with a fixing hole 301, the insulating body 70 is provided with a fixed column 701 in conjunction with the fixing hole 301. The fixing hole 301 is mated to the fixing post 701 to mount the shielding element 30 fixed on the insulating body 70. The shielding element 30 includes a plate section 31, a mating section 32 extending outwards from the plate section 31 the first direction AA, and a mounting section 33 formed by extending outward in the second direction BB from the plate section 31. The plate section 31 has a protruding portion 311 protruded outwards therefrom along the third direction CC that perpendicular to the first direction AA and the second direction BB. Preferably, the protruding portion 311 is electrically connected to the ground terminal 61. The protruding portion 311 is band-shaped, and extends on the plate section 31 from one end near the mounting section 33 to the other end near the mating section 32. Preferably, the protruding portion 311 and the mounting section 33 are provided with a gap 312 at the intersection position therebetween. By such an arrangement, the intensity of the plate section 31 may be effectively enhanced. In the present embodiment, the protruding portion 311 is banded, but it will be appreciated that in other embodiments, the protruding portion 311 may also be configured to be a supporting arm formed by bending the plate section 31.

Referring to FIG. 11 together with FIG. 12, the mating section 32 has a mating edge 321 on one side away from the plate section 31. The mating section 32 is provided with an anti-short grounding contact arm 322. One end of the anti-short grounding contact arm 322 is located along the mating edge 321, and the other end is extended along the first direction AA towards the plate section 31. A plurality of the anti-short grounding contact arms 322 are arranged along the second direction BB. A mating depression 323 is formed between the adjacent two anti-short grounding contact arms 322. The first contacting arm 6111 is correspondingly confronting to the anti-short grounding contact arm 322 of the shielding element 30, and the second contacting arm 6112 is resisting against another shielding element 30. The differential signal terminal pair is directly resisting within the mating depression 323. The maximum spacing between a bottom wall of the mating depression 323 and the anti-short grounding contact arm 322 is between 0 and 2.2 mm. Further, the mating section 32 includes a base wall 3201. The anti-short grounding contact arm 322 extends from the base wall 3201 along the third direction CC. The anti-short grounding contact arm 322 connects to the plate section 31 in the first direction AA, and mechanically contacts to the bottom wall of the mating depression 323 in the second direction BB. The maximum spacing between the anti-short grounding contact arm 322 and the base wall 3201 is between 0~1.1 mm. Further, the bottom wall of the mating depression 323 is depressed inwards from the base wall 3201. The maximum spacing between the bottom wall of the mating depression 323 and the base wall 3201 is between 0 to 1.1 mm.

Further, the anti-short grounding contact arm 322 is provided with a first mating tongue 3221 at one end thereof away from the plate section 31. The length of the anti-short grounding contact arm 322 in the first direction AA is between 0.2 to 10 mm, and the length of the first mating tongue 3221 in the first direction AA is between 0 to 6.4 mm.

Further, the bottom wall of the mating depression 323 is provided with a second mating tongue 3231 at one end thereof away from the plate section 31. The length of the second mating tongue 3231 in the first direction AA is between 0 to 6.4 mm A gap 3232 is defined between the first mating tongue 3221 and the adjacent second mating tongue 3231. While, as can be understood, the gap 3232 may not be formed in other embodiments.

Referring to FIG. 11 and FIG. 12, the bottom wall of the mating depression 323 is also provided with a tuning part 3233. The tuning part 3233 in the preferred embodiment is a tuning hole or a tuning pit. The tuning hole 3233 is a through hole extending through the bottom wall of the mating depression 323. As can be understood, when the tuning part 3233 is configured to be a tuning pit, the tuning pit is a non-through groove. Preferably, the bottom wall of the mating depression 323 has a plurality of the tuning parts 3233. The plurality of tuning parts 3233 may be symmetrically distributed, and may also be radiated distribution. When the bottom wall of the mating depression 323 is provided with a plurality of tuning parts 3233, the plurality of the tuning parts 3233 may all be tuning holes, or may also all be tuning pits, or may also be part of the tuning holes and part of the tuning pits.

Figure 13:
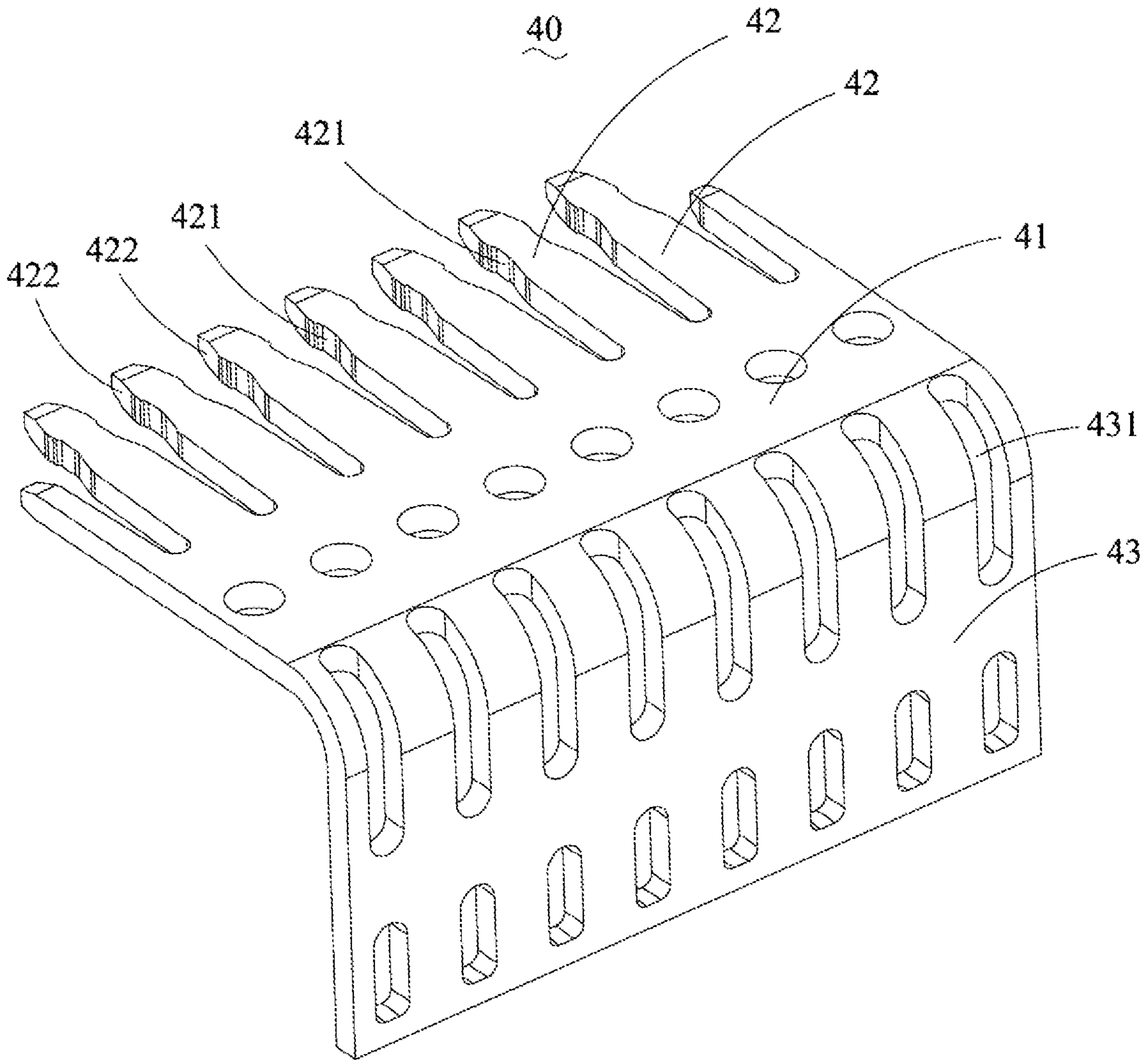
FIG. 13 is a perspective view of rear cover of the electrical connector as shown in FIG. 1.
Figure 14:
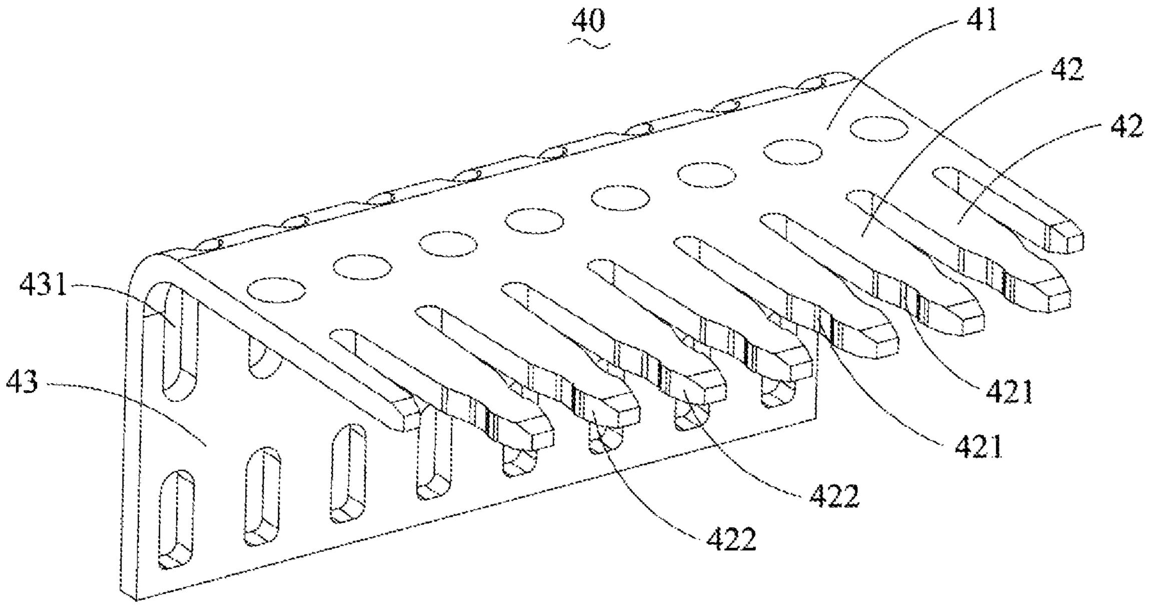
FIG. 14 is a perspective view of the rear cover as shown in FIG. 13 taken along a different aspect.

Referring to FIG. 13 and FIG. 14, the back shell or rear stiffener 40 is configured for fixing the plurality of the terminal modules 20 together in a whole. The back shell or the rear stiffener 40 includes a substrate 41, a plurality of insert plates 42 formed by extending outward from one end of the substrate 41 and an extension plate 43 formed by extending outward from the other end of the substrate 41. The insert plates 42 are inserted into the corresponding retaining recesses 752 to fix the terminal modules 20 into a whole. The retaining recess 752 is provided with a first limiting structure 7522. The insert plate 42 is provided with a second limiting structure 421 engaging with the first limit structure 7522. The terminal module 20 and the back shell 40 are secured together by the engagement between the first limit structure 7522 and the second limit structure 421. In the present embodiment, the first limit structure 7522 is formed as a protrusion, and the second limit structure 421 is defined as a groove which is in conjunction with the limit protrusion 7522. Preferably, the limit protrusion 7522 is provided with a first lead surface 7523. The insert plate 42 has a second lead surface 422 formed at one end thereof away from the substrate 41. The first lead surface 7523 is mated with the second lead surface 422 to make the limit protrusion 7522 smoothly inserted into the limit groove 421.

Further, the extension plate 43 is further provided with a secondary slot 431. The insulating body 70 is further provided with a secondary board 702 for mating with the secondary slot 431. The secondary insert board 702 is inserted into the secondary slot 431 so that the back shell 40, the terminal modules 20 can be fixed together. Preferably, the secondary insert board 702 is provided with a bump (not shown). The bump is mated to the secondary slot 431 by interference.

Turn back to FIG. 2, the insulating base 50 is plate-shaped, for matching with and securing the terminal module 20 and the shielding element 30 together as a whole. The insulating base 50 is provided with a plurality of holes for the first mounting portion 612, the second mounting portion 622 passing therethrough.

Compared with the prior art, when the electrical connector 100 of the present invention engages with the complementary connector, a grounding path is established between the shielding element 30, the grounding terminal 61 and the grounding contact of the complementary connector, which thereby increases the electromagnetic isolation between the differential signal terminal pairs, decreases the insertion loss and reduces crosstalk.

Figure 15:
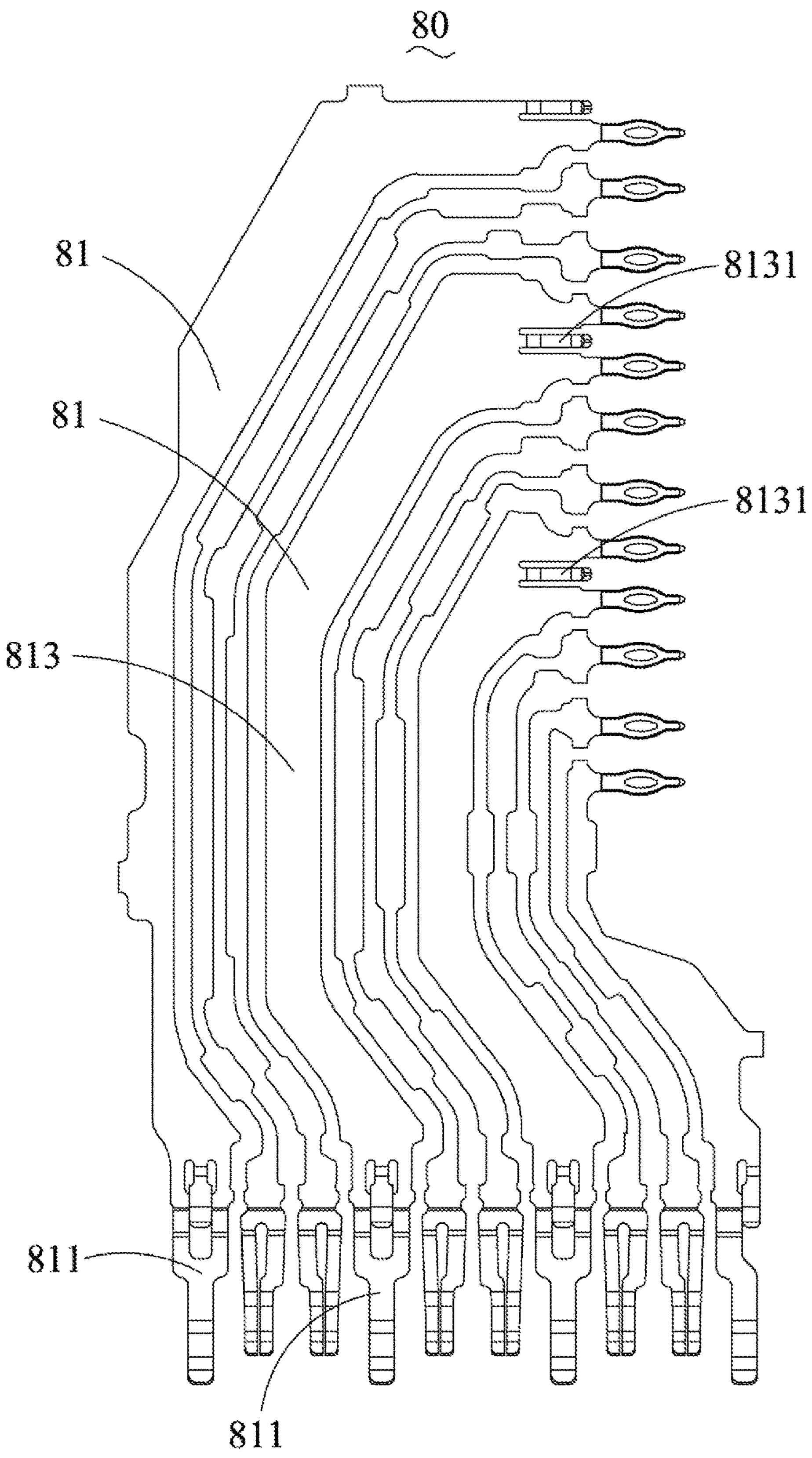
FIG. 15 is a view of the contact wafer of the electrical connector in accordance with a second embodiment.

Referring to FIG. 15, the present invention further discloses another embodiment of the terminal assembly 80. The structure of the terminal assembly 80 is substantially the same as the structure of the terminal assembly 60, the difference is that, the grounding terminal 81 of the terminal assembly 80 further comprises a third contact arm 8131 electrically connected to the third grounding element. The third contact arm 8131 is formed on the first connection portion 813 and extends outward in the fourth direction. The third contact arm 8131 is formed by an elastic contact arm, or a rigid contact arm. In this embodiment, the third grounding element is the shielding means located between the adjacent two terminal assemblies 80.

Furthermore, the present invention also discloses a grounding structure, comprising the terminal assembly 60/80, a first grounding element and a second grounding element. The first grounding element and the terminal assembly 60/80 are intervalley arranged along the third direction perpendicular to the first direction and the second direction. The grounding terminal 61/81 is simultaneously electrically connected to the first grounding element and the second grounding element. The first grounding element and the second grounding element are respectively disposed on both sides of the grounding terminal 61/81 along the third direction. In the present embodiment, the first grounding element is a shielding plate and the second grounding element is a grounding terminal of the mated complementary connector.

Figure 16:
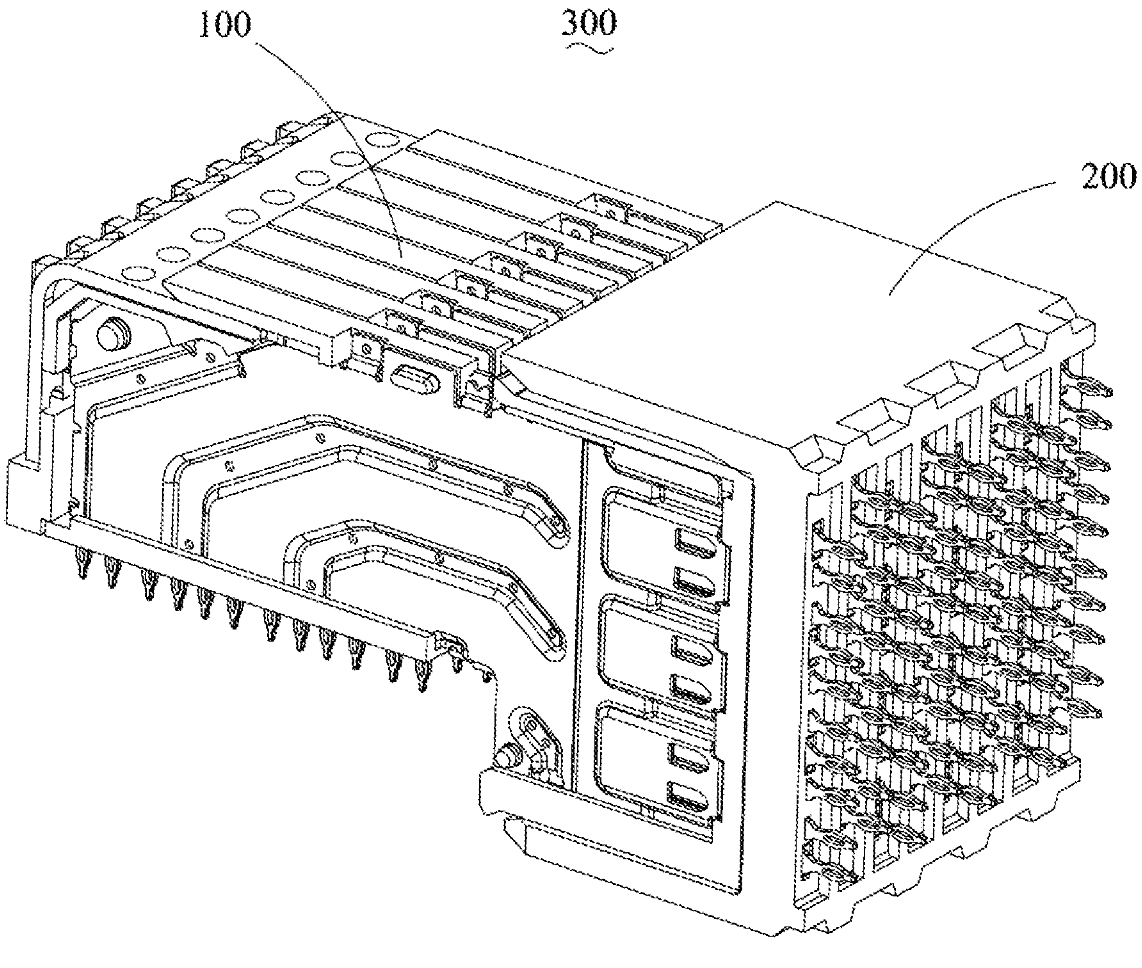
FIG. 16 is a perspective view of an electrical connector assembly of the present disclosure.

The present invention also discloses an electrical connector assembly 300 composed by the electrical connector 100 and the mating complementary connector 200 as shown in FIG. 16. It should be noted here that, the electrical connector in the present invention is a high-speed, high-density backplane connector.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present disclosure to the full extent indicated by the broadest general meaning of the terms in which the appended claims are expressed.

What is claimed is:

1. A shielding means for a high-speed electrical connector, comprising:

a main substrate having a front edge and a bottom edge, said front edge extending along a top-to-bottom direction (BB) and the bottom edge extending along a front-to-back direction (AA) perpendicular to said top-to-bottom direction; and a mating section extending from said main substrate with a plurality of mating tongues and a plurality of mating depressions formed thereon along said top-to-bottom direction, each of said plurality of mating depressions is arranged between two of said mating tongues, said plurality of mating tongues and said plurality of mating depressions deviating from each other with respect to said main substrate;

wherein the mating section comprises a base wall and a plurality of the anti-short grounding contact arms extending from the base wall, the base wall interconnecting with said main substrate and the plurality of anti-short grounding contact arms arranged along the top-to-bottom direction;

wherein the plurality of mating tongues are correspondingly formed on the anti-short grounding contact arms;

wherein each of the mating depressions has a bottom wall depressed inwards from the base wall, and wherein a maximum spacing between the bottom wall of the mating depression and the base wall is between 0 to 1.1 mm;

wherein said main substrate has a plurality of protruding portions protruded therefrom along a left-to-right direction perpendicular to both the top-to-bottom direction and the front-to-back direction;

wherein an elongated groove is defined on said main substrate correspondingly opposite to said protruding portion;

wherein a gap is formed at an intersection position between said protruding portion and said front edge;

wherein said mating tongues and said protruding portions have same protruding directions with respect to the main substrate;

wherein each of said mating depression has a pair of tuning holes defined therethrough along said front-to-back direction; and wherein the front-to-back direction projecting area of the mating tongue does not overlap with the front-to-back direction projecting area of the mating depression, while the front-to-back direction projecting area of the mating depression partially overlaps with the front-to-back direction projecting area of the protruding portion.

2. The shielding means as claimed in claim 1, wherein the top-to-bottom direction is a height direction of the high-speed, high-density electrical connector.

3. The shielding means as claimed in claim 1, wherein each said protruding portion extends between said front edge and said bottom edge and is formed by several segments.

4. A high-speed electrical connector, comprising:

a plurality of terminal modules, each terminal module comprises grounding terminals and differential signal pairs embedded within an insulating body;

a plurality of shielding means as claimed in claim 1, each shielding means stacked arranged between each two adjacent terminal modules; and a shell fixing said stacked shielding means and terminal modules along a front-to-back direction;

wherein said shielding means comprise a plurality of mating tongues and a plurality of protruding portions formed thereon, each mating tongue is configured to mechanically and electrically connecting to corresponding grounding terminal;

wherein said insulating body defines a plurality of cutouts thereon and said grounding terminals of said terminal modules are partially exposed from said cutouts;

wherein said protruding portions of said shielding means correspondingly retained between said cutouts of said insulating body to securely connecting the shielding means on said terminal modules.

5. A high-speed electrical connector, comprising:

a plurality of terminal modules, each terminal module comprises grounding terminals and differential signal pairs embedded within an insulating body;

a plurality of shielding means, each shielding means stacked arranged between each two adjacent terminal modules; and a shell fixing said stacked shielding means and terminal modules along a front-to-back direction;

wherein said shielding means comprise a plurality of mating tongues and a plurality of protruding portions formed thereon, each mating tongue is configured to mechanically and electrically connecting to corresponding grounding terminal;

wherein said insulating body defines a plurality of cutouts thereon and said grounding terminals of said terminal modules are partially exposed from said cutouts;

wherein said protruding portions of said shielding means correspondingly retained between said cutouts of said insulating body to securely connecting the shielding means on said terminal modules;

wherein said shielding means has a main substrate having a front edge and a bottom edge, said front edge extending along a top-to-bottom direction and the bottom edge extending along the front-to-back direction; and wherein said mating section extends from said main substrate with a plurality of mating depressions formed thereon, wherein each of said plurality of mating depression is arranged between two of said mating tongues, said plurality of mating tongue and said plurality of mating depression deviating from each other with respect to said main substrate;

wherein an elongated groove is defined on said main substrate correspondingly opposite to said protruding portion;

wherein a gap is formed at an intersection position between said protruding portion and said bottom edge;

wherein each of said mating depression has a pair of tuning holes defined therethrough; and wherein along said front-to-back direction, the projecting area of the mating tongue does not overlap with the projecting area of the mating depression, while the projecting area of the mating depression partially overlaps with the projecting area of the protruding portion.

6. The high-speed electrical connector as claimed in claim 5, wherein said protruding portion extends between said front edge and said bottom edge and is formed by several segments.

7. The high-speed electrical connector as claimed in claim 5, wherein the number of the protruding portions is same as the number of the mating depressions; and wherein said mating tongues and said protruding portions have same protruding directions with respect to the main substrate.

8. The high-speed electrical connector as claimed in claim 5, wherein said shell comprising a front cover and a rear stiffener; and wherein both of said different signal pairs and said grounding terminals have contacting fingers located in said front cover; and wherein said stacked terminal modules and said shielding means are fixed together by said rear stiffener from a rear side thereof.

* * * * *